（12） United States Patent
Eskridge (10) Patent No.: US 7,069,784 B1
(45) Date of Patent: Jul. 4, 2006

(54) PENDULOUS IN-PLANE MEMS ACCELEROMETER DEVICE

(75) Inventor: Mark H. Eskridge, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 11/024,885

(22) Filed: Dec. 29, 2004

(51) Int. Cl.
  *G01P 15/10* (2006.01)
  *G01P 15/125* (2006.01)
(52) U.S. Cl. .............................. 73/514.29; 73/514.32
(58) Field of Classification Search ............ 73/514.32, 73/514.16, 514.29, 514.34, 514.35, 493
See application file for complete search history.

(56) References Cited

U.S. PATENT DOCUMENTS

| | | | |
|---|---|---|---|
| 4,945,765 A | | 8/1990 | Roszhart |
| 5,006,487 A | | 4/1991 | Stokes |
| 5,974,880 A | * | 11/1999 | Yamaguchi et al. ..... 73/514.32 |
| 6,810,735 B1 | * | 11/2004 | Kaneko et al. ............... 73/493 |

* cited by examiner

*Primary Examiner*—Helen Kwok
(74) *Attorney, Agent, or Firm*—Black Lowe & Graham PLLX (57) ABSTRACT

A high aspect ratio microelectromechanical system device for measuring an applied force, the device being a cellular in-plane accelerometer formed of a base having a substantially planar mounting surface. A pair of substantially rigid fixed electrode structures are formed in a doped silicon mechanism layer, the fixed electrode structures having substantially parallel and mutually opposing pickoff electrode surfaces oriented substantially perpendicular to the planar mounting surface of the base and spaced apart along an input direction parallel with the planar mounting surface of the base, each of the fixed electrode structures being anchored to the mounting surface of the base. A pendulous electrostatic comb is formed in the doped silicon mechanism layer and oriented substantially perpendicular to the planar mounting surface of the base, the electrostatic comb being pendulously suspended from the mounting surface of the base between the fixed electrode structures for motion along the input direction.

23 Claims, 7 Drawing Sheets

PENDULOUS IN-PLANE MEMS ACCELEROMETER DEVICE

FIELD OF THE INVENTION

The present invention relates to micromachined accelerometer devices, and in particular to suspension structures for comb-type capacitive readout force transducers for measuring forces applied to a proof mass and methods for manufacturing the same.

BACKGROUND OF THE INVENTION

A widely used technique for force detection and measurement employs a mechanical capacitive readout force transducer having a capacitive output proportional to the force applied. In one such mechanical transducer, one or more capacitors are formed between an instrument frame and a proof mass suspended by a flexure. A force applied to the proof mass along a particular axis will cause displacement of the proof mass relative to the frame, which varies the capacitive output of the capacitors. The force applied to the proof mass is quantified by measuring a resultant change in capacitance.

Such a micro-accelerometer is a combination of mechanical structure comprising the proof mass, suspension flexure, and fixed instrument framework, and electrical structure comprising capacitor electrodes, current-feed connections, and external circuitry forming a capacitor circuit.

More precisely, a micromachined proof mass is connected by a flexure to a fixed instrument frame forming a part of the framework of the transducer. A capacitor is formed between one or more electrode surfaces of the hinged proof mass and opposing surfaces of cooperating fixed electrodes of the instrument frame. Movement of the proof mass electrode surfaces relative to the cooperating fixed electrodes changes the value of the capacitor of the capacitor circuit. This variation in the capacitor value depends on the relative movement of the proof mass by forces, i.e., acceleration, applied to the proof mass. A change in the measurement of the capacitor therefore represents an acceleration measurement.

According to one well-known technique, the proof mass's electrodes and cooperating fixed electrodes are formed having intermeshing comb-like fingers wherein a large quantity of substantially parallel-plate capacitors are formed between the opposing surfaces of the fixed electrode and proof mass fingers.

Capacitive readout force transducers employing such intermeshing comb-like fingers have been fabricated from a body of semiconductor material, such as silicon, as microelectromechanical systems, or "MEMS," integrated micro devices or systems combining electrical and mechanical components fabricated using integrated circuit (IC) batch processing techniques.

In the most general form, MEMS consist of mechanical microstructures, microsensors, microactuators and electronics integrated in the same environment, i.e., on a silicon chip. MEMS is an enabling technology in the field of solid-state transducers, i.e., sensors and actuators. The microfabrication technology enables fabrication of large arrays of devices, which individually perform simple tasks but in combination can accomplish complicated functions. Current applications include accelerometers, pressure, chemical and flow sensors, micro-optics, optical scanners, and fluid pumps. For example, one micromachining technique involves masking a body of silicon in a desired pattern, and then deep etching the silicon to remove unmasked portions thereof. The resulting three-dimensional silicon structure functions as a miniature mechanical force sensing device, such as an accelerometer that includes a proof mass suspended by a flexure. Existing techniques for manufacturing these miniature devices are described in U.S. Pat. No. 5,006,487, "Method of Making an Electrostatic Silicon Accelerometer" and U.S. Pat. No. 4,945,765 "SILICON MICROMACHINED ACCELEROMETER," the complete disclosures of which are incorporated herein by reference.

High aspect ratio MEMS or "HIMEMS" is one known process for producing such MEMS devices, including MEMS accelerometer devices. HIMEMS permits fabrication of intricate device designs in two dimensions, but requires a fixed device thickness, on the order of a cookie cutter. Capacitive readout in-plane accelerometers fabricated as HIMEMS devices may includes a proof mass suspended on flexures with a quantity of fingers formed along its edges, the fingers on the proof mass intermeshing with cooperating electrode fingers on a fixed structure to form a quantity of capacitors there between. As the proof mass moves in response to an applied force, the intermeshing fingers of the proof mass approach or recede from the fingers of the fixed structure, whereby capacitance there between increases or decreases. The change in capacitance between fingers is a measure of the force applied to the proof mass, which can be interpreted as an acceleration signal.

One problem with such capacitive readout in-plane accelerometers is that, when fabricated as HIMEMS devices, forces applied out-of-plane relative to the intermeshing fingers causes out-of-plane separation or "de-meshing" of the fingers, which decreases the inter-finger capacitance and registers as a decrease in the applied force or acceleration. This out-of-plane separation or "de-meshing" of the fingers is a device "cross-axis sensitivity" that results in a decrease of inter-finger capacitance whether the out-of-plane force or acceleration is applied positively or negatively.

Figure 1:
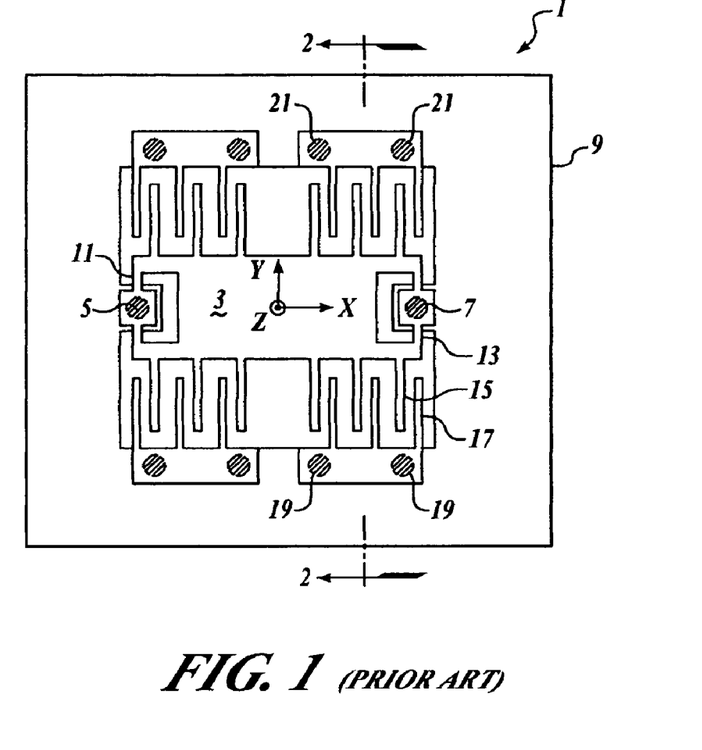
FIG. 1 is a plan view and FIG. 2 is an end-on cross-sectional view taken through the device illustrated in FIG. 1.
Figure 2:
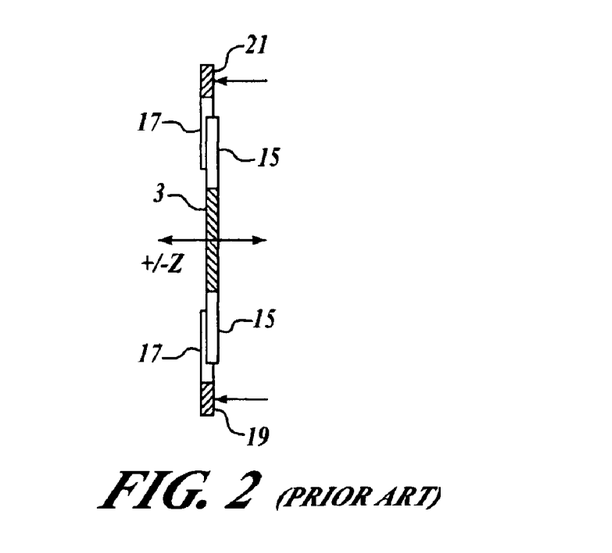

FIGS. 1 and 2 illustrate one known capacitive readout in-plane accelerometer fabricated as a high aspect ratio MEMS or HIMEMS device that suffers from cross-axis sensitivity due to out-of-plane (shown as ±z axis) separation or "de-meshing" of the fingers in response to positively and negatively applied out-of-plane forces or accelerations, wherein FIG. 1 is a plan view and FIG. 2 is a cross-sectional end view taken through FIG. 1. The capacitive readout in-plane accelerometer device 1 includes a proof mass 3 suspended at two end points 5, 7 from a frame 9 formed in a substrate. The proof mass 3 is usually secured to the frame 9 by an anodic bond or adhesive indicated generally at the end points 5, 7. The proof mass 3 is suspended at each of the two end points 5, 7 by a respective pair of flexures 11, 13 for motion along the sensitive axis of the device 1, which is illustrated here as the x-axis. When the HIMEMS device 1 is a capacitive readout in-plane accelerometer, as illustrated in FIGS. 1 and 2, the proof mass 3 may be equipped with multiple comb-like fingers 15 projected outwardly from the main body of the proof mass, indicated at 3. Each of the fingers 15 cooperates with an electrode finger 17 to form one of multiple different capacitors. Surfaces of the fingers 15 in the y-z plane and cooperating surfaces electrode fingers 17, also in the y-z plane, form opposing plates of a capacitor formed there between. The cooperating electrode fingers 17 are rigidly secured to the frame 9 by an anodic bond or adhesive indicated generally at intermittent points 19, 21. The electrode fingers 17 are thereby fixed relative to the moveable proof mass fingers 15. As a positive or negative force is applied along the x-axis, the proof mass 3 and associated capacitor plates formed on the fingers 15 approach or recede from the cooperating capacitor plates formed on the relatively fixed electrode fingers 17, whereby capacitance between the cooperating fingers 15, 17 increases or decreases. In an accelerometer device, the change in capacitance is a measure of the acceleration force applied to the proof mass 3.

An in-plane acceleration or other force applied to the proof mass 3 along the sensitive or x-axis may have a cross-axis component, shown in the example as the y-axis. However, such in-plane cross or y-axis component is masked by one or both of the over-lap of the proof mass and fixed electrode fingers 15, 17; and a change in capacitance between the fingers 15, 17 on one side of the proof mass 3 being matched by an equal and opposite change between the fingers 15, 17 on the opposite side of the proof mass.

Such compensating effects are not present in HIMEMS devices for out-of-plane components of the applied force or acceleration. Because the HIMEMS process operates only on a substrate of uniform thickness, the proof mass fingers 15 and fixed electrode fingers 17 must be formed having identical cross-axis width, i.e., z-axis dimension. In practical terms, the fixed electrodes 17 cannot be formed oversized in the z-axis dimension relative to the proof mass fingers 15, whereby changes in capacitance would be eliminated for motion of the proof mass fingers 15 along the z-axis. Nor is a resultant capacitance decrease from off-set along the z-axis of the proof mass fingers 15 relative to the fixed electrode fingers 17 compensated by an equal and opposite increase in capacitance on the opposite side of the proof mass.

Rather, as illustrated in FIG. 2, a force or component of force applied out-of-plane, i.e., acting along the z-axis, causes the proof mass 3 and its associated capacitor plates formed on the fingers 15 to translate along the z-axis relative to the fixed electrodes 17 which are supported against such movement. The proof mass fingers 15 "de-mesh" or become off-set relative to the normally intermeshing fixed electrodes 17. The result of this de-meshing or relative off-set is a decrease in capacitance between the fingers 15, 17. The decrease in capacitance appears as a reduction in the acceleration or other force operating along the x-axis, thereby resulting in an inaccurate indication.

Another problem with such capacitive readout in-plane accelerometers fabricated as HIMEMS devices is that the mass 3 must be large, e.g., 1 mm-to-10 mm on an edge, to provide both sensitivity to acceleration and sufficient space for enough comb teeth to provide a useful scale factor.

Such a large proof mass 3 also deform under vibration in complex manners at undesirably low frequencies.

Furthermore, such a large proof mass 3 may also have undesirable thermal sensitivities driven by a difference in coefficient of thermal expansion (CTE) between the proof mass 3 and the frame 9 to which it is secured.

SUMMARY OF THE INVENTION

The present invention overcomes limitations of the prior art by providing a cellular in-plane accelerometer having a base formed of either a silicon substrate or a borosilicate glass substrate and having a substantially planar mounting surface, and a mechanism layer formed of a thin layer of doped silicon and coupled by anodic or adhesive bonding to the mounting surface of the base. An elongated cantilevered beam is formed in the mechanism layer and is structured to operate as a combination proof mass and electrostatic comb, one portion of the cantilevered beam is anchored to the mounting surface of the base for motion of the cantilevered beam in a direction substantially parallel to the mounting surface of the base. A cooperating pair of substantially rigid outside electrode structures is formed in the mechanism layer and fixed to the mounting surface of the base. Each of the pair of outside electrode structures is formed with respective parallel and mutually opposing pickoff surfaces spaced-apart on opposite sides of the cantilevered beam in the direction of motion thereof. Means are provided for forming respective first and second capacitors between the cantilevered beam and the pickoff surfaces of each of the pair of outside electrode structures.

According to one aspect of the invention, the portion of the cantilevered beam that is anchored to the mounting surface of the base is arranged at an approximate center of the cantilevered beam for dividing the elongated cantilevered beam into two substantially identical cantilevered beams, and thus operates as a common pendulum mount for the two cantilevered beams.

According to another aspect of the invention, the cantilevered beam further is formed with a hinge arranged between the portion of the cantilevered beam that is anchored to the mounting surface of the base and a remainder of the cantilevered beam that is distal from the anchored portion.

According to another aspect of the invention, cellular in-plane accelerometer includes a plurality of the elongated cantilevered beams and a plurality of the cooperating pairs of outside electrode structures arrayed relative to the mounting surface of the base with respective first and second capacitors between the cantilevered beam and the pickoff surfaces of each of the cooperating pair of outside electrode structures.

According to still other aspects of the invention, methods are provided for forming an accelerometer as a microelectromechanical system device for measuring an applied force.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 1 and 2 illustrate a known capacitive readout in-plane accelerometer fabricated as a high aspect ratio MEMS or HIMEMS device that suffers from cross-axis sensitivity, wherein

DETAILED DESCRIPTION OF PREFERRED EMBODIMENT

In the Figures, like numerals indicate like elements.

The present invention is a cellular in-plane accelerometer formed of a base having a substantially planar mounting surface; a pair of substantially rigid fixed electrode structures formed in a doped silicon mechanism layer and having substantially parallel and mutually opposing pickoff electrode surfaces oriented substantially perpendicular to the planar mounting surface of the base and spaced apart along an input direction parallel with the planar mounting surface of the base; a pendulous electrostatic comb oriented substantially perpendicular to the planar mounting surface of the base and suspended from the mounting surface of the base between the fixed electrode structures for motion along the input direction; and an anchor coupled between each of the fixed electrode structures and the mounting surface of the base.

Figure 3:
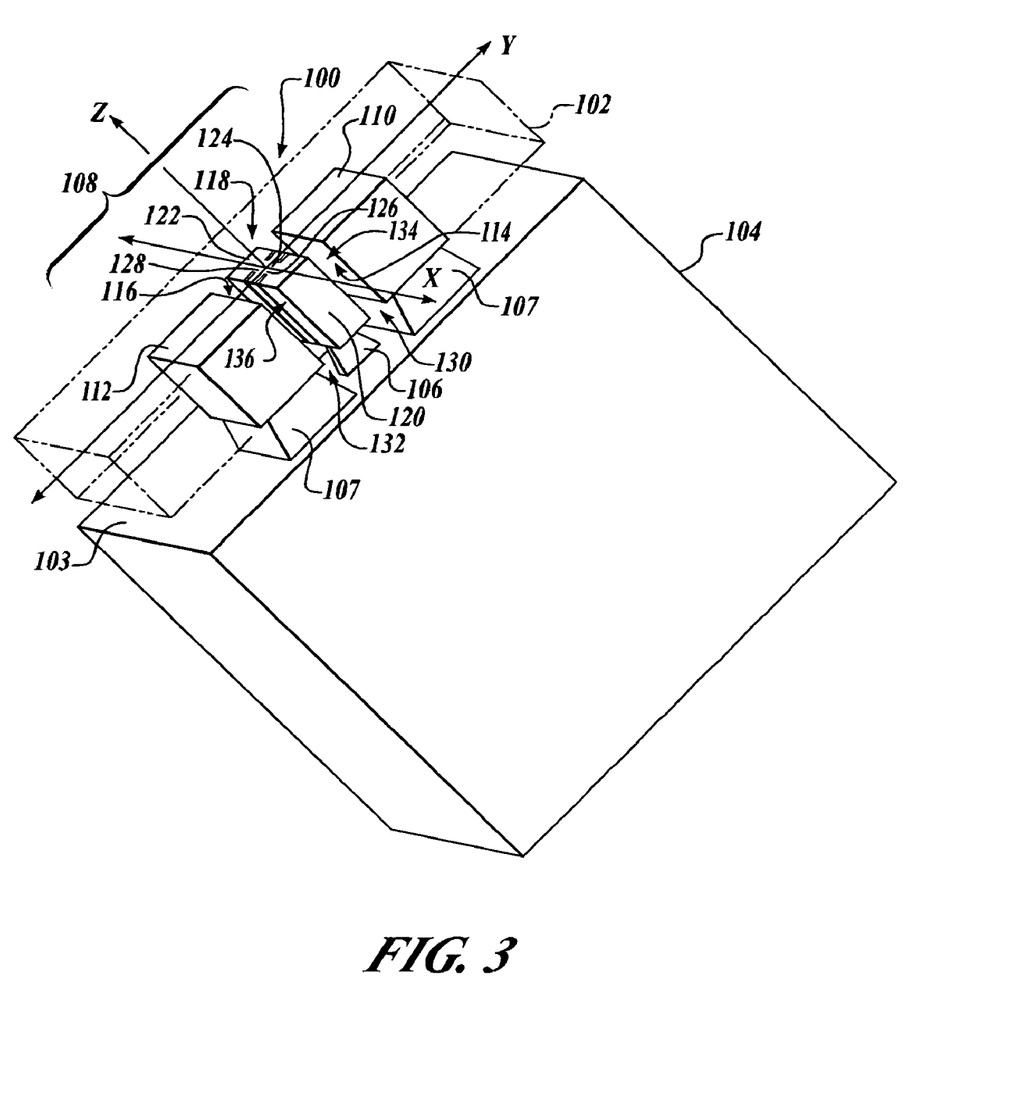
FIG. 3 is a perspective view that illustrates the cellular in-plane accelerometer 100 of the present invention.

Accordingly, FIG. 3 is a perspective view that illustrates the cellular in-plane accelerometer 100 of the present invention formed as a MEMS (Micro Electro Mechanical System) device using, by example and without limitation, the HIMEMS process. According to one embodiment of the present invention, a thin mechanism layer 102 formed by a sheet of doped silicon on the order of 20 µm-to-200 µm is attached by an anodic or adhesive bond to a substantially planar mounting surface 103 portion of a base substrate 104 formed of borosilicate glass or silicon. This mechanism layer 102 can be shaped by the HIMEMS process into an intricate design in the two x, y dimensions, but generally has a fixed z dimension or thickness. The base 104 is optionally selectively etched to form anchors 106, 107 before the mechanism layer 102 is attached. When attached to the anchors 106, 107 an accelerometer mechanism 108 formed in the thin mechanism layer 102 is anchored but is still able to deform in response to sensed acceleration inputs.

The accelerometer mechanism 108 formed in the thin mechanism layer 102 includes two substantially rigid first and second outside electrode structures 110, 112 formed with respective parallel spaced-apart first and second electrode or "pickoff" surfaces 114, 116 with a proof mass 118 suspended between them. The outside structures 110, 112 are stiff relative to both the cross-axis (x) and the sensitive axis (y) of the accelerometer 100. The substantially rigid outside electrode structures 110, 112 resist movement in the sensitive y-axis by being extensive or "thick" in the y-dimension, or by forming a box or frame, as illustrated in subsequent figures. The substantially rigid outside electrode structures 110, 112 are optionally secured to the substrate by anchors 107 that extend over a significant portion of their attachment area, as illustrated in FIG. 3. The substantially rigid outside electrode structures 110, 112 may optionally include one or more lightening holes or an internal lattice, as illustrated in subsequent figures, to increase their stiffness-to-mass ratio.

The proof mass 118 is long in the x-dimension and thin in the y-dimension and is secured by the anchor 106 at its center. The proof mass 118 thus forms a pair of substantially identical cantilevered beams 120, 122 with one on each side of a common pendulum mount 124 that is structured as a central core of the proof mass 118 that is secured to the base 104 by the anchor 106. The cantilevered beams 120, 122 are far more flexible in the y-dimension than the stiff outside structures 110, 112 so that they deflect along the y-axis under acceleration input along the y-axis, but are sufficiently stiff in the x-dimension to resist cross-axis inputs and in the z-dimension to resist out-of-plane translations.

As illustrated in FIG. 3, each set of substantially rigid outside electrode structures 110, 112 cooperates with one proof mass 118 to form a pair of pendulous accelerometers each having one of the cantilevered beams 120, 122 operating as its proof mass. The two resultant proof masses 120, 122 share the common pendulum mount 124 where the anchor 106 secures the center of the bifurcated proof mass 118 to the base 104 with the cantilevered beams 120, 122 extending along the x-dimension for providing the respective proof masses of the two accelerometers.

When practiced as a pair of accelerometers, each of the cantilevered-beam proof masses 120, 122 are optionally suspended by respective hinges 126, 128 that are formed along the z-dimension. The hinges 126, 128 are structured to allow the respective cantilevered beams 120, 122 to translate in one direction parallel to the structure of the device, e.g., in the y-dimension, as illustrated in FIG. 3. In operation, the accelerometer formed by the cantilevered-beam proof mass 120 suspended by the hinge 126 between the substantially rigid outside electrode structures 110, 112 forms first and second capacitors 130, 132 with both the pickoff surfaces 114, 116: the first capacitor 130 is formed between a first capacitive surface 134 of the proof mass 120 and the first pickoff surface 114, and the second capacitor 132 is formed between a second capacitive surface 136 of the proof mass 120 and the second pickoff surface 116. The acceleration signal is the differential capacitance between the two capacitors formed between the single cantilevered proof mass 120 and the respective first and second pickoff surfaces 114, 116. The second substantially identical cantilevered-beam proof mass 122 is similarly suspended by its hinge 128 between different portions of the same pickoff surfaces 114, 116 and thus form third and fourth capacitors with the respective pickoff surfaces 114, 116 that are substantially identical to the first and second capacitors formed by the first proof mass 120 with the pickoff surfaces 114, 116. Thus described, the accelerometer 100 is an open loop device.

The present invention simultaneously solves several shortcomings of the prior art discussed herein. The tendency for "de-meshing" or off-setting of the prior art proof mass fingers 15 along the z-axis relative to the normally intermeshing fixed electrodes 17 is overcome by the extraordinarily low mass of the individual proof masses formed by the respective cantilevered beams 120, 122. In the prior art devices, as illustrated in FIGS. 1 and 2, the proof mass 3 was very large relative to the comb teeth 15. The large proof mass that was required in prior art devices for both sensitivity to acceleration and space for enough comb teeth for adequate scale factor. Such large proof masses require large areas of real estate, and the device package must be large to accommodate it. Additionally, such large proof masses tend to deform under vibration in complex manners at undesirably low frequencies. These large proof masses also tend to have undesirable thermal sensitivities that are driven by differences in coefficient of thermal expansion (CTE) between the proof mass 3 and the base or frame 9 to which it is secured.

In contrast to such prior art devices, the present invention combines the comb teeth of the prior art with the proof mass in the cantilevered-beam proof masses 120, 122 by suspending each tooth beam 120, 122 from the common pendulum mount 124 that is secured directly to the base 104 by its anchor 106. Therefore, the cantilevered-beam proof masses 120, 122 are restricted from motion along the z-axis by their individual anchor 106. Because the proof masses 120, 122 of the present invention operate as the comb teeth 15 of the prior art, each proof mass is relatively small. According to one embodiment, each of the proof masses 120, 122 of the present invention are about the same size and mass as the individual comb teeth 15 of the prior art. The much lower mass of the proof masses 120, 122 also help to resist the tendency toward motion along the z-axis that causes de-meshing and consequent decrease in capacitance in prior art devices. The much smaller proof masses 120, 122 also reduce the area of real estate required by the accelerometer 100 as compared with the area required by the large proof mass 3 of the prior art.

Natural frequencies of the proof masses 120, 122 of the present invention are high as compared with prior art devices, because the mass of any proof mass structure 120, 122 is very low as compared with the proof mass 3 of the prior art. Therefore, the tendency of large proof masses to deform under vibration in complex manners at undesirably low frequencies is alleviated by the proof masses 120, 122 of the present invention.

Thermal sensitivities that are that are driven in prior art devices by CTE differences between the large proof mass 3 and the frame 9 are significantly reduced because the effective distance over which differences in CTE acts is restricted to the distance from pendulum anchor 106 and stationary electrode anchors 107, which is very small as compared with suspension of the large prior art proof mass 3 at its widely separated end points 5, 7, as illustrated in FIG. 1.

High scale factor is achieved according to the present invention because the effective comb teeth provided by the one or more proof masses 120, 122 that are long as compared to the comb teeth 15 of the prior art.

Figure 4:
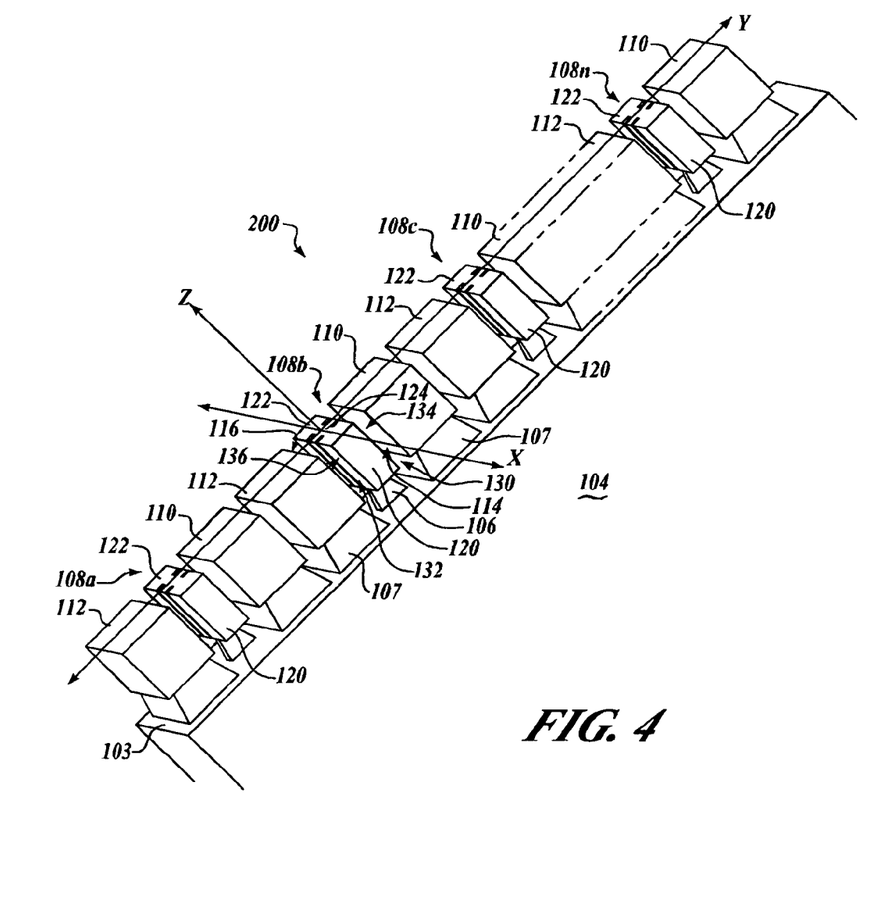
FIG. 4 is a perspective view that illustrates an optional cellular embodiment of the invention wherein a single accelerometer mechanism is combined with a plurality of similar accelerometer mechanisms.

Furthermore, FIG. 4 is a perspective view that illustrates an optional cellular embodiment of the invention wherein the accelerometer 100 is a single accelerometer mechanism 108 that is combined into a plurality of other accelerometer mechanisms 108a, 108b, 108c through 108n all formed in the mechanism layer 102 and coupled to the base 104 by individual anchors 106. Accordingly, any desirable scale factor is obtained by selecting a requisite number of n accelerometer mechanisms 108. As illustrated in FIG. 4, at least a portion of the plurality of the single or double accelerometer mechanisms 108 are optionally combined into a collective cellular accelerometer 200 made up of the selected number of accelerometer mechanisms 108a through 108n. Each of the accelerometer mechanisms 108a through 108n includes one or more of the proof masses 120, 122 that perform the dual functions of proof masses and comb teeth in the accelerometer 100, shown in FIG. 3, and a pair of the substantially rigid spaced-apart outside electrode structures 110, 112 having respective parallel spaced-apart electrode or "pickoff" surfaces 114, 116. Because each accelerometer mechanism 108a through 108n includes its own outside electrode structures 110, 112, as the proof masses 120, 122 of one accelerometer 108a approach closer to the second "pickoff" surface 116, the corresponding proof masses 120, 122 of another accelerometer 108b does not simultaneously recede from the second "pickoff" surface 116 as would be the case if the two adjacent accelerometers 108, 108b shared a single outside electrode structures 112. The first outside electrode structures 110 are electrically interconnected, and the second outside electrode structures 112 are electrically interconnected, so that all of the first "pickoff" surfaces 114 are mutually electrically interconnected, and all of the second "pickoff" surfaces 116 are mutually electrically interconnected. Therefore, because adjacent accelerometers 108, 108b each output separate signals in response to a change in acceleration input, the sign of one signal can be inverted before taking the difference between them, which permits linearization of the 1/d relationship of capacitance so that the net signal is increased.

When extended along the y-axis as shown in FIG. 4, each of the one or more proof masses 120, 122 of the different accelerometer mechanisms 108a through 108n is substantially parallel with the proof masses 120, 122 of the other accelerometer mechanisms 108a through 108n.

According to one embodiment of the present invention, the column of accelerometer mechanisms 108a through 108n extended across the length of the mechanism layer 102 in the y-dimension is repeated across the width of the mechanism layer 102 in the x-dimension to form an x-y array of such accelerometer mechanisms 108a through 108n.

Several design advantages are realized using the cellular accelerometer mechanisms 108a, 108b, 108c through 108n. The accelerometer 200 is a repetitive pattern of a simple design that lends itself to simple analysis. Scale factor is selected by selecting an appropriate quantity of the accelerometer mechanisms 108a through 108n. The accelerometer 200 remains small as compared with prior art devices since the proof mass is combined with the electrostatic comb teeth. The other advantages discussed for the accelerometer 100 are also present in the cellular accelerometer 200.

ALTERNATIVE EMBODIMENTS

Figure 5:
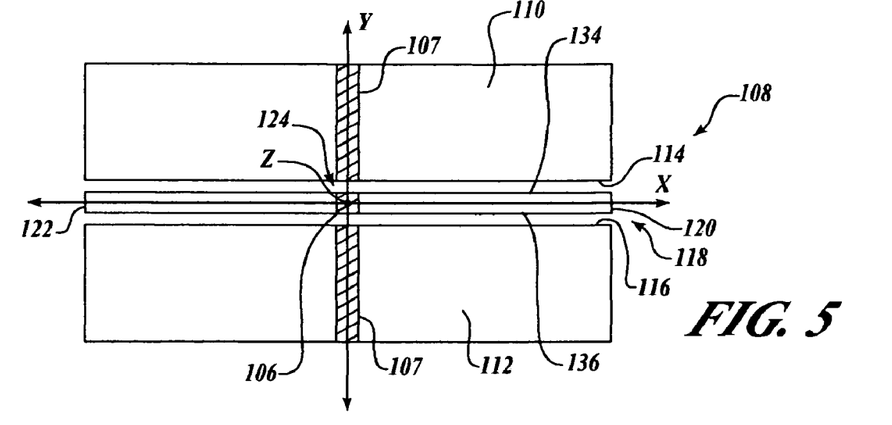
FIGS. 5 through 15 illustrate different alternative embodiments of the accelerometer mechanism of the invention.

FIG. 5 is a plan section view that illustrates an alternative embodiment of the accelerometer mechanism 108 wherein the interface between the anchor 106 and the proof mass 118 are represented by cross-hatched areas, and the interface between the anchors 107 and each of the substantially rigid outside electrode structures 110, 112 is also represented by cross-hatched areas. The alternative proof mass 118 illustrated in FIG. 5 includes the two substantially identical cantilevered-beam proof masses 120, 122 extending on either side of the common pendulum mount 124 that is the central core of the proof mass 118, with the common pendulum mount 124 being secured to the base 104 by the anchor 106. The two cantilevered-beam proof masses 120, 122 are substantially planar sheets formed in the x-z plane. The two cantilevered-beam proof masses 120, 122 are thus sufficiently thin in the y-dimension, which is parallel with the device input axis, relative to their length along the x-dimension and their height in the z-dimension that they tend to deflect or deform along the y-axis in response to an acceleration input, but are too stiff in the x- and z-dimensions to respond to cross-axis and out-of-plane accelerations.

Furthermore, in contrast to the anchors 107 that extend over a significant portion of the attachment area for each of the substantially rigid outside electrode structures 110, 112 as illustrated in FIG. 3, the anchors 106 illustrated in FIG. 5 secure the outside electrode structures 110, 112 to the base 104 along much narrower linear areas that are elongated in the y-dimension and aligned along the y or input axis. The long, narrow anchors 107 combine the thickness of the substantially rigid outside electrode structures 110, 112 to resist or even substantially eliminate deformation and deflection the outside electrode structures 110, 112 in response to acceleration inputs along the y or input axis.

Figure 6:
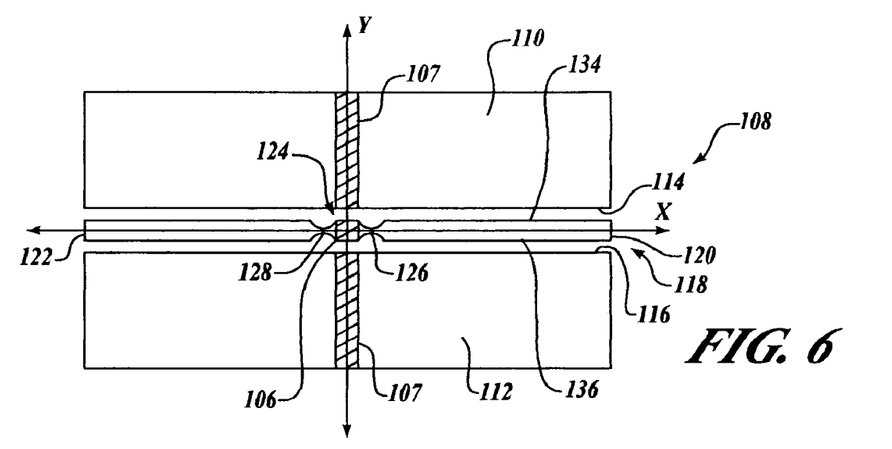

FIG. 6 is a plan section view that illustrates another alternative embodiment of the accelerometer mechanism 108 wherein the two cantilevered-beam proof masses 120, 122 are suspended from the common pendulum mount 124 at the center of the proof mass 118 by the respective hinges 126, 128 that are formed as areas of reduced cross-section or "necked-down" areas of the respective proof masses 120, 122 to be flexible about the z-dimension. The hinges 126, 128 are structured to allow the respective cantilevered beams 120, 122 to rotate about the device z-axis.

Figure 7:
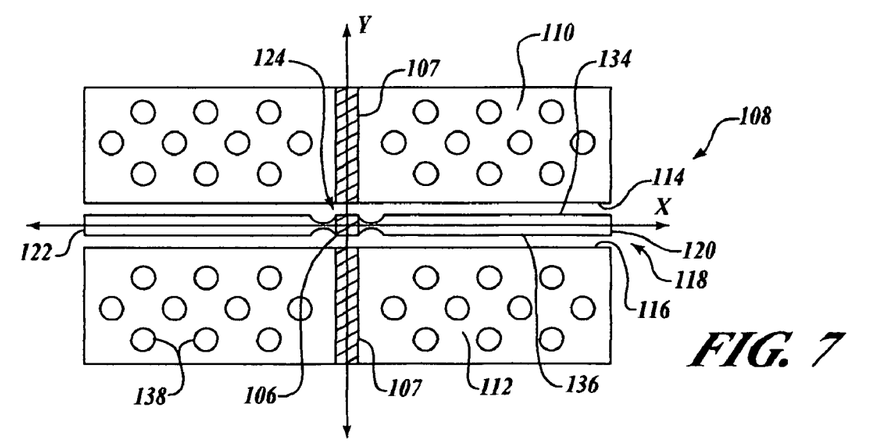

FIG. 7 is a plan section view that illustrates another alternative embodiment of the accelerometer mechanism 108 wherein the two substantially rigid outside electrode structures 110, 112 are structured with a plurality of lightening holes 138 that increase stiffness to mass ratio.

Figure 8:
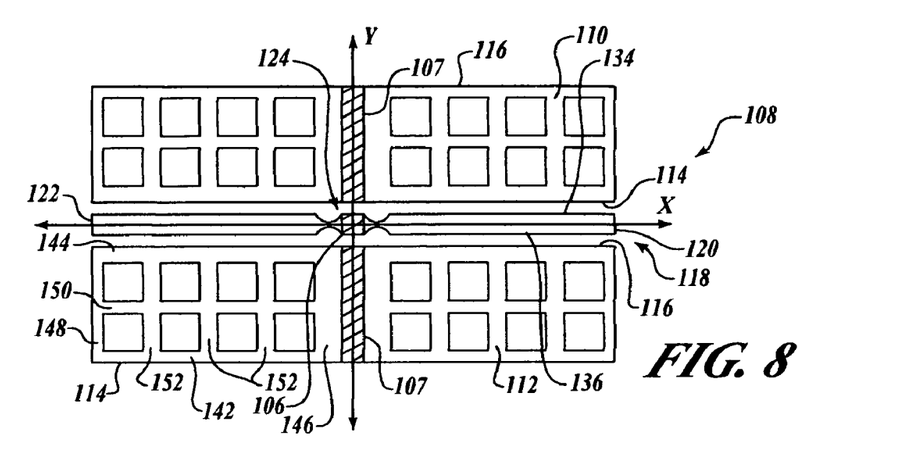

FIG. 8 is a plan section view that illustrates another alternative embodiment of the accelerometer mechanism 108 wherein the two substantially rigid outside electrode structures 110, 112 are structured with internal lattice structures 140 that increase stiffness-to-mass ratio. By example and without limitation, according to one embodiment of the invention, the two substantially rigid outside electrode structures 110, 112 are structured as open rectangular boxes each having mutually perpendicular peripheral walls 142, 144, 146, 148 extruded along the z-dimension. The walls 142, 144 extending in the x-z dimension include the pickoff surfaces 114, 116 on their respective outside surfaces. The inner wall 146 provides a solid volume of material for securing each of the substantially rigid structures 110, 112 to the base 104. The outer walls 148 merely cap the ends of the extruded section and provide an anchor wall for attachment of one or more internal lattice walls 150 extended in the x-z dimension between the inner surfaces of the outer walls 148 the opposing inner wall 146. The internal lattice structure includes a plurality of internal lattice walls 152 extended in the y-z dimension between the inside surfaces of the opposing walls 142, 144 that intersect the one or more internal lattice walls 150 to bridge the otherwise open space between the peripheral walls 142, 144, 146, 148.

It will be recognized that equivalent internal lattice structures 140 that increase stiffness-to-mass ratio are also possible. By example and without limitation, according to one embodiment of the invention, the internal lattice structures 140 is formed by the plurality of lightening holes 138 illustrated in FIG. 7. According to another alternative equivalent embodiment of the invention, the internal lattice structures 140 are formed by a honeycomb structure made up of triangular, pentagonal, hexagonal, octagonal or other multi-sided apertures formed through each of the substantially rigid structures 110, 112.

Figure 9:
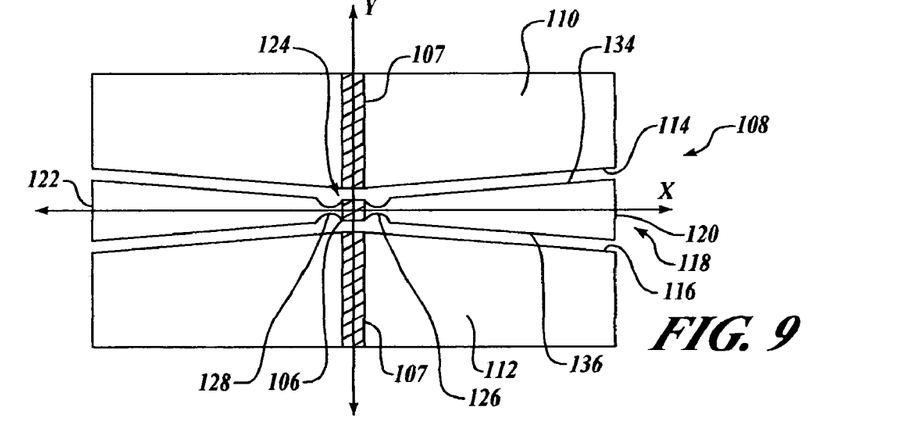

When the invention is practiced using either the MEMS or HIMEMS processes any of the structures are optionally formed having a complex shape extruded along the z-dimension. Accordingly, FIG. 9 is a plan section view of another alternative embodiment of the accelerometer mechanism 108 wherein the two cantilevered beams 120, 122 are extruded having a cross-section in the x-y dimension that increase as a function of the distance from the respective hinges 126, 128. By example and without limitation, the two cantilevered beams 120, 122 are formed as trapezoids or pie shapes having increasing area or volume, and therefore increasing mass, farther from the axes of the respective hinges 126, 128. The increased mass at a distance from the hinge axes increases pendulosity of the proof masses 120, 122.

As illustrated by FIG. 9, the first and second electrode or "pickoff" surfaces 114, 116 are optionally shaped to work cooperatively with the opposing surfaces 134, 136 of pendulums 120 and 122, whereby the accelerometer output more closely resembles that of a parallel plate capacitor.

Figure 10:
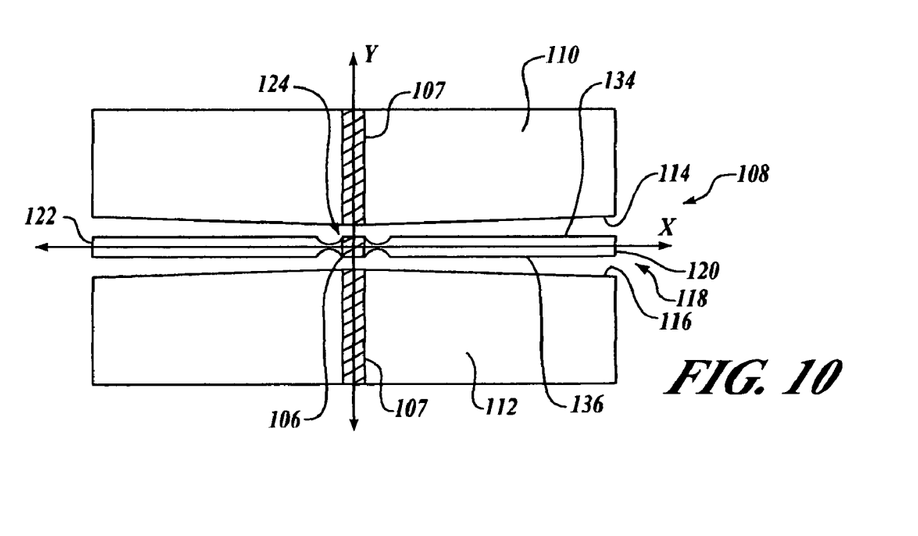

FIG. 10 is a plan section view that illustrates another alternative embodiment of the accelerometer mechanism 108 wherein the two substantially rigid outside electrode structures 110, 112 are extruded having pickoff surfaces 114, 116 in the x-z dimension that are increasingly spaced apart at as a function of increasing distance from the common pendulum mount 124 at the center of the proof mass 118. Accordingly, the pickoff surfaces 114, 116 are gradually increasingly spaced away from the respective capacitive surfaces 134, 136 of the two cantilevered beams 120, 122 of the proof mass 118 as a function of distance from the common pendulum mount 124. This gradually increasing spacing increases the length of the pickoff surfaces 114, 116 in the x-dimension, which in turn improves linearity of the accelerometer 100. According to one embodiment of the invention illustrated in FIG. 10, the pickoff surfaces 114, 116 are gently curved surfaces such that the spacing between the opposing pickoff surfaces 114, 116, and hence between proof mass capacitive surfaces 134, 136 and the respective pickoff surfaces 114, 116, increases more rapidly as the distance from the center of the proof mass 118 increases.

Figure 11:
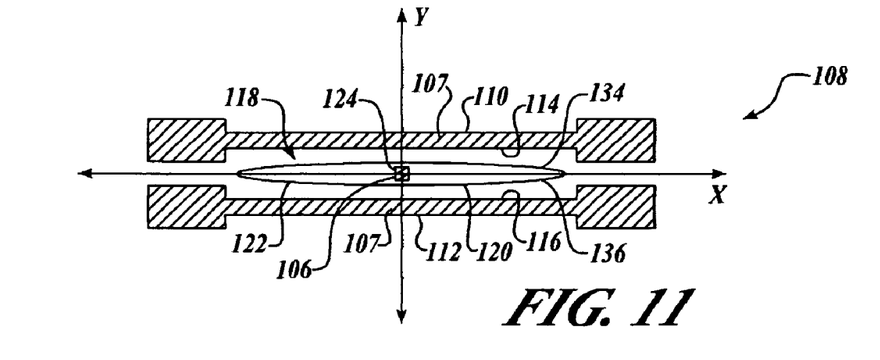

FIG. 11 is a plan section view that illustrates another alternative embodiment of the accelerometer mechanism 108 wherein the two substantially rigid outside electrode structures 110, 112 are extruded having pickoff surfaces 114, 116 in the x-z dimension that are uniformly spaced apart, while the two cantilevered beams 120, 122 of the proof mass 118 are extruded having capacitive surfaces 134, 136 that are spaced apart as a function of increasing distance from the common pendulum mount 124 at the center of the proof mass 118. Accordingly, the respective capacitive surfaces 134, 136 of the two cantilevered beams 120, 122 of the proof mass 118 are gradually increasingly spaced away from the respective pickoff surfaces 114, 116 as a function of distance from the common pendulum mount 124. This gradually increasing spacing increases the length of the capacitive surfaces 134, 136 in the x-dimension, which in turn improves linearity of the accelerometer 100. According to one embodiment of the invention illustrated in FIG. 11, the capacitive surfaces 134, 136 are gently curved surfaces such that the spacing between the proof mass capacitive surfaces 134, 136 and the respective pickoff surfaces 114, 116, increases more rapidly as the distance from the center of the proof mass 118 increases.

Figure 12:
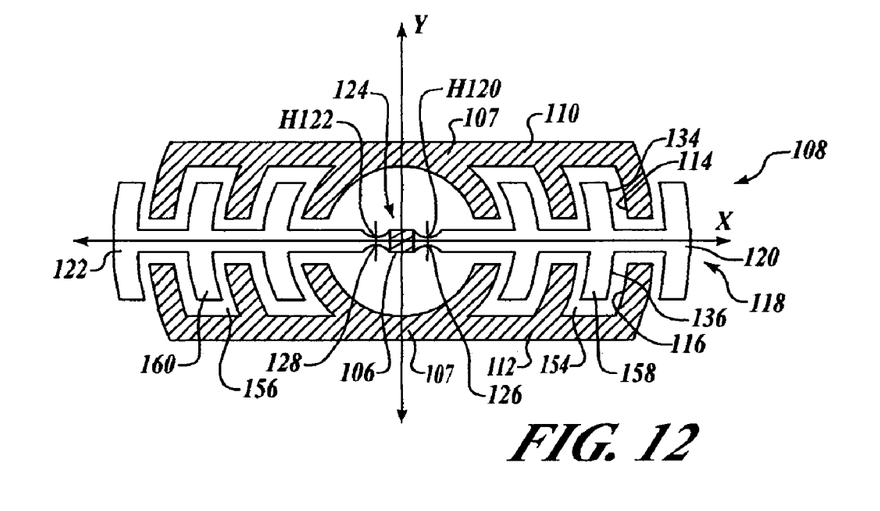

FIG. 12 is a plan section view that illustrates another alternative embodiment of the accelerometer mechanism 108 wherein the two substantially rigid outside electrode structures 110, 112 are extruded having a pickoff surfaces 114, 116 in the x-z dimension that include a plurality of curved slots 154, 156 that are concentric about the respective hinge axes $H_{120}$, $H_{122}$ about which the two cantilevered beams 120, 122 of the proof mass 118 rotate under acceleration loads input along the y-axis. The pickoff surfaces 114, 116 are formed on the inside surfaces of the respective curved slots 154, 156. The different proof mass beams 120, 122 are each formed with a plurality of cooperating curved comb teeth 158, 160 extending from the respective cantilevered beams 120, 122 also concentric about the respective hinge axes $H_{120}$, $H_{122}$. The curved comb teeth 156 include the proof mass capacitive surfaces 134, 136 and thus form the first and second capacitors 130, 132 with the pickoff surfaces 114, 116. The cooperating curved slots 154 and curved comb teeth 156 permit the two cantilevered beams 120, 122 to rotate on their respective hinges 120, 122 without changing the distance between the proof mass capacitive surfaces 134, 136 and the respective pickoff surfaces 114, 116. Rather, differential capacitance is substantially proportional to the overlap between proof mass capacitive surfaces 134, 136 and the respective pickoff surfaces 114, 116. Accordingly, the change in capacitance is a substantially linear function of input acceleration. Furthermore, when operated as a closed-loop device of the type discussed herein, the capacitive rebalance drive is similarly a substantially linear function of input acceleration.

Figure 13:
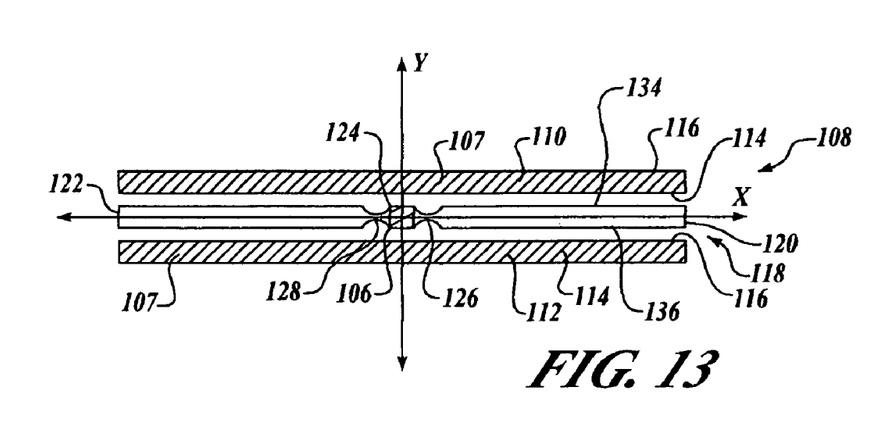

FIG. 13 is a plan section view that illustrates another alternative embodiment of the accelerometer mechanism 108 wherein the two substantially rigid outside electrode structures 110, 112 are substantially planar sheets formed in the x-z plane similar to the two cantilevered beams 120, 122 of the proof mass 118. While the two electrode structures 110, 112 are thus thin in the y-dimension, the anchors 107 extend over all or at least a significant portion of the attachment area for securing each of the substantially rigid outside electrode structures 110, 112 solidly to the base 104. The extensive area of the anchors 107 resist or even eliminate deformation and deflection the outside electrode structures 110, 112 in response to acceleration inputs along the y or input axis. When operated according to the cellular embodiment of the present invention, the thin but substantially rigid outside electrode structures 110, 112 permit a large number of the accelerometer mechanisms 108a through 108n to be arranged in a very small area as compared with a proof mass of the prior art having the same scale factor, i.e., the same number of comb teeth of the same size. Obviously, the thin outside electrode structures 110, 112 permit a much smaller package than the relatively thicker outside electrode structures 110, 112 of the alternative embodiment illustrated in FIG. 5.

Figure 14:
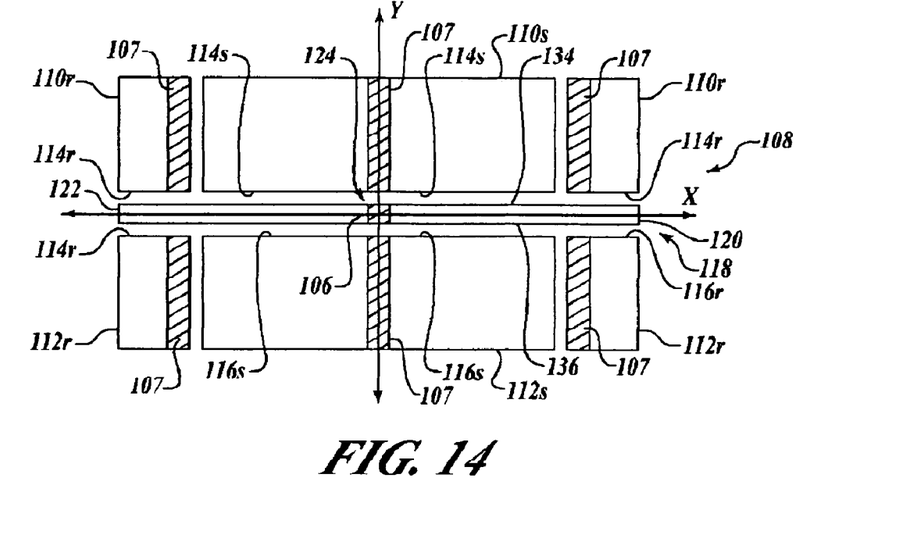

FIG. 14 is a plan section view that illustrates another alternative embodiment of the accelerometer of the present invention wherein the accelerometer 100 is a closed-loop device. Accordingly, the electrode plates 114, 116 are divided into sense portions 114s, 116s and rebalance drive portions 114r, 116r. The rebalance drive portions 114r, 116r use electrostatic attraction to rebalance the device in a manner well-known in the art. Separation between the sense portions 114s, 116s and rebalance drive portions 114r, 116r is achieved by physical separation the outside electrode structures 110, 112 into sense structures 110s, 112s and rebalance drive structures 110r, 112r each being anchored to the base 104 by independent anchors 107.

Figure 15:
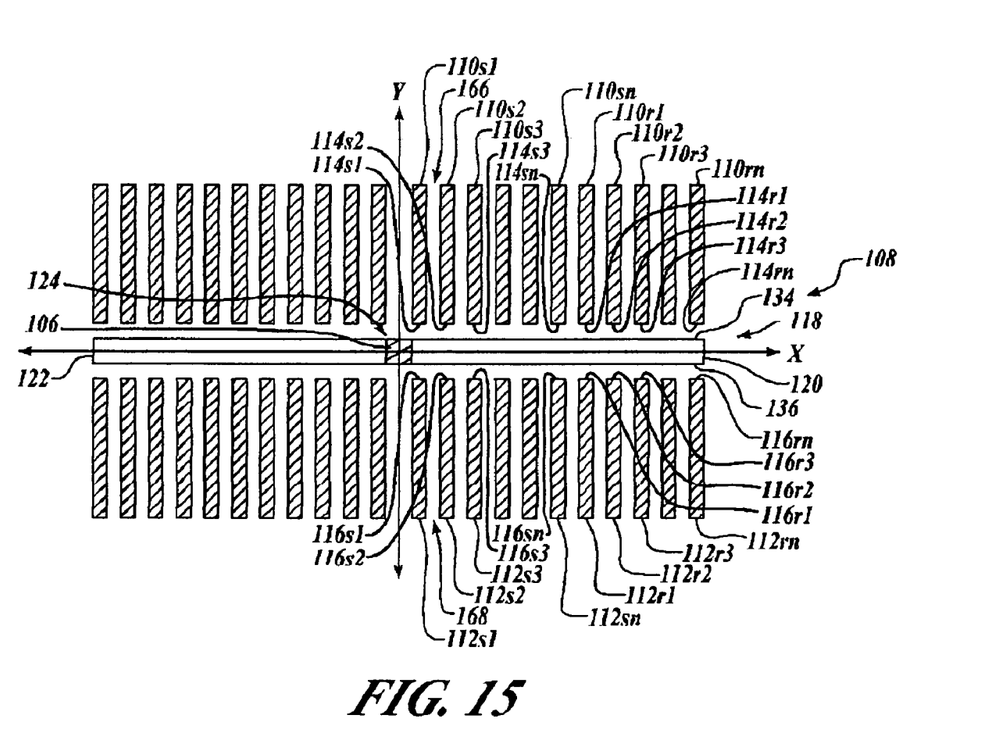

FIG. 15 is a plan section view that illustrates still another alternative embodiment of the accelerometer of the present invention wherein the accelerometer 100 wherein the substantially rigid outside electrode structures operated as sense electrode structures 110s, 112s are divided many, many times respectively into outside sense electrode structures 110s1, 110s2, 110s3 through 110sn and into outside sense electrode structures 112s1, 112s2, 112s3 through 112sn. If present, the outside electrode structures 110, 112 operated as rebalance drive structures 110r, 112r are divided many, many times respectively into outside rebalance drive electrode structures 110r1, 110r2, 110r3 through 110rn and into outside rebalance drive electrode structures 112r1, 112r2, 112r3 through 112rn. This division of the outside sense electrode structures 110s, 112s and, if present, rebalance drive electrode structures 110r, 112r, results in small gaps 166, 168 that permit gas flow between adjacent outside sense electrode structures 110s1 through 110sn and 112s1 through 112sn, and if present, to flow between adjacent outside rebalance drive electrode structures 110r1 through 110rn and 112r1 through 112rn. As a result, the device exhibits very little gas damping.

Thus divided, the outside sense electrode structures 110s, 112s and, if present, rebalance drive electrode structures 110r, 112r, look like teeth of a comb oriented substantially perpendicular to the proof mass 118. Division of the outside sense electrode structures 110s, 112s permits the sense pickoff plates 114s, 116s to be divided into any number of small sense portions 114s1, 114s2, 114s3 through 114sn and small sense portions 116s1, 116s2, 116s3 through 116sn. If present, division of the rebalance drive electrode structures 110r, 112r permits the rebalance drive electrodes 114r, 116r to be divided into any number of small rebalance drive portions 114r1, 114r2, 114r3 through 114rn and small rebalance drive portions 116r1, 116r2, 116r3 through 116rn.

The division of the sense pickoff plates 114s, 116s and, if present, the rebalance drive electrodes 114r, 116r, permits any number of small sense portions 114s1 through 114sn and 116s1 through 116sn, and if present, the small rebalance drive portions 114r1 through 114rn and 116r1 through 116rn are optionally provided in any location along the two cantilevered beams 120, 122 of the proof mass 118; the small sense portions 114, 116 and rebalance drive portions 114r, 116r may even be interleaved.

If the outside sense electrode structures 110s1 through 110sn and 112s1 through 112sn and, if present, the outside rebalance drive electrode structures 110r1 through 110rn and 112r1 through 112rn, are separated by small enough gaps 166, 168, e.g., smaller than about 10 µm or so, fringe or field effect will "fill" the gap between adjacent structures so that very little degradation in performance occurs because of the "missing" electrode area represented by the gaps 166, 168. The number and location of which electrode "comb teeth" are operated as sense portions 114s, 116s and which are rebalance drive portions 114r, 116r is optionally varied using a feedback loop to make the accelerometer 100 more sensitive (operating more as teeth as sense portions 114s, 116s) under lower acceleration, to increase the device g-force input range (operating more as teeth as rebalance drive portions 114r, 116r) with lower sensitivity. Which of electrode structures 110 and 112 are operated as sense portions 114s, 116s and which are operated as rebalance drive portions 114r, 116r is optionally selected to improve linearity under high acceleration inputs.

The basic embodiments as well as the different alternative embodiments may all be practiced using the HIMEMS process to create a silicon mechanism that is bonded to a base 104 fabricated of either borosilicate glass or silicon, as discussed herein.

While the preferred embodiment of the invention has been illustrated and described, it will be appreciated that various changes can be made therein without departing from the spirit and scope of the invention.

What is claimed is:

1. A cellular in-plane accelerometer, comprising:
   a base having a substantially planar mounting surface;
   a pair of substantially rigid fixed electrode structures formed in a doped silicon layer and having substantially parallel and mutually opposing pickoff electrode surfaces oriented substantially perpendicular to the planar mounting surface of the base and spaced apart along an input direction parallel with the planar mounting surface of the base;
   an anchor coupled between each of the fixed electrode structures and the mounting surface of the base; and
   a pendulous electrostatic comb formed in the doped silicon layer and being oriented substantially perpendicular to the planar mounting surface of the base and suspended from the mounting surface of the base between the opposing pickoff electrode surfaces of the fixed electrode structures for motion along the input direction.

2. The accelerometer of claim 1 wherein the pendulous electrostatic comb is suspended from the mounting surface of the base by an anchor coupled between the mounting surface of the base and a pendulum mount portion of the pendulous electrostatic comb.

3. The accelerometer of claim 2 wherein the pendulous electrostatic comb further comprises a hinge portion arranged between the pendulum mount portion and a cantilevered beam portion.

4. The accelerometer of claim 2 wherein the pendulous electrostatic comb further comprises a pair of pendulous electrostatic combs each suspended from the pendulum mount portion for motion along the input direction, the pendulum mount portion being arranged between the pair of pendulous electrostatic combs.

5. The accelerometer of claim 4 wherein each of the pair of pendulous electrostatic combs further comprises a hinge portion arranged between the pendulum mount portion and a cantilevered beam portion.

6. The accelerometer of claim 1, further comprising a plurality of accelerometer mechanisms, each of the accelerometer mechanisms comprising one of the pair of substantially rigid fixed electrode structures and one of the pendulous electrostatic comb suspended there between.

7. The accelerometer of claim 1, further comprising a pair of substantially rigid fixed electrode structures formed in the doped silicon layer and having substantially parallel and mutually opposing rebalance drive electrode surfaces oriented substantially perpendicular to the planar mounting surface of the base and spaced apart along the input direction on opposite sides of the pendulous electrostatic comb.

8. The accelerometer of claim 7 wherein each of the fixed electrode structures having the pickoff electrode surfaces further comprises a plurality of fixed electrode structures each having one of the pickoff electrode surfaces.

9. The accelerometer of claim 7 wherein each of the fixed electrode structures having the rebalance drive electrode surfaces further comprises a plurality of fixed electrode structures each having rebalance drive electrode surfaces.

10. The accelerometer of claim 1 wherein each of the pair of substantially rigid fixed electrode structures further comprises a substantially flexible fixed electrode structure that is rigid as a function of the anchor extending across substantially an entirety of an anchor interface surface of the electrode structure.

11. A cellular in-plane accelerometer, comprising:
a base having a substantially planar mounting surface,
a mechanism layer of doped silicon anchored to the base mounting surface;
an elongated beam formed in the mechanism layer and anchored to the base mounting surface for pendulous motion along an input axis that is substantially parallel with the base mounting surface;
first and second fixed electrode structures formed in the mechanism layer in substantially fixed arrangement with the base, the first and second fixed electrode structures being formed with respective first and second substantially planar pickoff electrode surfaces closely spaced on opposite sides of the elongated beam and substantially parallel therewith; and
means for generating respective first and second capacitors between the elongated beam and the first and second fixed electrode structures.

12. The accelerometer of claim 11, further comprising means for measuring a differential between the first and second capacitors.

13. The accelerometer of claim 12 where the elongated beam further comprises a foreshortened portion that is anchored to the base mounting surface, the elongated beam being structured for pendulous motion relative to the anchored foreshortened portion.

14. The accelerometer of claim 13 wherein the anchored foreshortened portion is arranged at a central position in the elongated beam.

15. The accelerometer of claim 11, further comprising a plurality of the elongated beam and a plurality of the first and second fixed electrode structures.

16. A cellular in-plane accelerometer, comprising:
a base having a substantially planar mounting surface and being funned of one of a silicon substrate and a borosilicate glass substrate;
a mechanism layer coupled to the mounting surface of the base, the mechanism layer being formed of a thin layer of doped silicon;
an elongated cantilevered beam formed in the mechanism layer and being structured to operate as a combination proof mass and electrostatic comb, one portion of the cantilevered beam being anchored to the mounting surface of the base for motion of the cantilevered beam in a direction substantially parallel to the mounting surface of the base;
a cooperating pair of substantially rigid outside electrode structures formed in the mechanism layer and fixed to the mounting surface of the base, the pair of outside electrode structures each being formed with respective parallel and mutually opposing pickoff surfaces spaced-apart on opposite sides of the cantilevered beam in the direction of motion thereof; and
means for forming first and second capacitors between the cantilevered beam and the pickoff surfaces of each of the pair of outside electrode structures.

17. The accelerometer of claim 16 wherein the portion of the cantilevered beam being anchored to the mounting surface of the base is arranged at an approximate center of the cantilevered beam for dividing the elongated cantilevered beam into two substantially identical cantilevered beams and operates as a common pendulum mount for the two cantilevered beams.

18. The accelerometer of claim 16 wherein the cantilevered beam further comprises a hinge arranged between the portion of the cantilevered beam being anchored to the mounting surface of the base and a remainder of the cantilevered beam distal from the anchored portion.

19. The accelerometer of claim 16, further comprising a plurality of the elongated cantilevered beam and a plurality of the cooperating pairs of outside electrode structures arrayed relative to the mounting surface of the base.

20. A method for forming an accelerometer as a microelectromechanical system device for measuring an applied force, the method comprising:
in a thin layer of silicon coupled to a substantially planar mounting surface of a base substrate, tanning an elongated cantilevered beam for operation as a combination proof mass and electrostatic comb having one portion anchored to the mounting surface of the base substrate for motion of the cantilevered beam in a direction substantially parallel to the mounting surface of the base substrate;
in the thin layer of silicon, forming first and second substantially rigid outside electrode structures fixed to the mounting surface of the base substrate, each of the outside electrode structures being formed with respective parallel and mutually opposing pickoff surfaces spaced-apart on opposite sides of the cantilevered beam in the direction of motion thereof; and forming first and second capacitors between the cantilevered beam and the pickoff surfaces of each of the outside electrode structures.

21. The method of claim 20 wherein forming the elongated cantilevered beam having one portion anchored to the mounting surface of the base substrate further comprises anchoring a center portion of the beam to the mounting surface of the base substrate for forming two substantially symmetric cantilevered beams on opposite sides of the anchored portion for substantially symmetrical motion relative to the mounting surface of the base substrate.

22. The method of claim 20 wherein forming the elongated cantilevered beam having one portion anchored to the mounting surface of the base substrate further comprises forming a hinge portion in the cantilevered beam between the anchored portion and a remainder of the cantilevered beam distal from the anchored portion.

23. The method of claim 20, further comprising forming in the layer of silicon coupled to the mounting surface of the base substrate a plurality of the elongated cantilevered beam and a plurality of the first and second substantially rigid outside electrode structures fixed to the mounting surface of the base substrate with each of the outside electrode structures being formed with respective parallel and mutually opposing pickoff surfaces spaced-apart on opposite sides of the cantilevered beam in the direction of motion thereof.

* * * * *